US010115552B2

(12) United States Patent
Mittelstadt

(10) Patent No.: US 10,115,552 B2
(45) Date of Patent: Oct. 30, 2018

(54) RETROFIT CAFI/GFI REMOTE CONTROL MODULE

(71) Applicant: SCHNEIDER ELECTRIC USA, INC., Schaumburg, IL (US)

(72) Inventor: Chad R. Mittelstadt, Cedar Rapids, IA (US)

(73) Assignee: Schneider Electric USA, Inc., Andover, MA (US)

( * ) Notice: Subject to any disclaimer, the term of this patent is extended or adjusted under 35 U.S.C. 154(b) by 169 days.

(21) Appl. No.: 14/969,501

(22) Filed: Dec. 15, 2015

(65) Prior Publication Data

US 2017/0169979 A1 Jun. 15, 2017

(51) Int. Cl.

| | |
|---|---|
| ***H02H 3/16*** | (2006.01) |
| ***H01H 71/12*** | (2006.01) |
| ***H01H 71/40*** | (2006.01) |

(52) U.S. Cl.
CPC .......... *H01H 71/128* (2013.01); *H01H 71/40* (2013.01); *H01H 2223/002* (2013.01)

(58) Field of Classification Search
CPC ............. H02H 3/16; H02H 3/162; H02H 3/33
USPC ...................................................... 361/42–50
See application file for complete search history.

(56) References Cited

U.S. PATENT DOCUMENTS

| | | | | |
|---|---|---|---|---|
| 6,621,669 B1 | | 9/2003 | Haun et al. | |
| 2009/0248329 A1* | | 10/2009 | Restrepo ............ | G01R 31/1272 702/59 |
| 2014/0211345 A1* | | 7/2014 | Thompson .......... | B60L 11/1816 361/42 |
| 2016/0072271 A1* | | 3/2016 | Packard ............... | H02H 1/0015 361/42 |

FOREIGN PATENT DOCUMENTS

WO WO2015002633 1/2015

OTHER PUBLICATIONS

"The Industry's First AFCI Receptacle SmartlockPro Outlet Branch Circuit AFCI Devices", downloaded from http://www.leviton.com/OA_HTML/SectionDisplay.jsp?section=55015&minisite=10251, Arc-Fault Circuit Interrupter (AFCI) on Feb. 8, 2016, 3 pages.

AFCI Receptacles, Eaton Powering Business Worldwide, downloaded from http://www.cooperindustries.com/content/public/en/wiring_devices/products/AFCI.html on Feb. 8, 2016, 8 pages.

* cited by examiner

*Primary Examiner* — Dharti Patel
(74) *Attorney, Agent, or Firm* — Locke Lord LLP

(57) ABSTRACT

A retrofit CAFI/GFI remote control module may provide dual function protection for simple thermal-magnetic circuit breakers in a residential load center with arc fault and ground fault protection. The module provides line sensors and electronic processing to detect ground faults or arc faults, or both, and operates a bistable relay between the branch breaker and the load to open the circuit, which can then be remotely or manually reset.

10 Claims, 5 Drawing Sheets

RETROFIT CAFI/GFI REMOTE CONTROL MODULE

FIELD OF THE INVENTION

The present disclosure relates to methods and systems for adding fault detection and interruption to the branch circuits of an ordinary thermal-magnetic circuit breaker equipped load center panelboard.

BACKGROUND OF THE INVENTION

There is a large installed base of residential load centers which rely on simple thermal-magnetic circuit breakers which only protect branch circuits by the detection of overcurrent conditions resulting in a trip of the circuit breaker and separating its movable contacts. Typical circuit breakers in the home must be reset manually by operation of the circuit breaker handle.

The electrical panel or panelboard, typically known as a "load center" in residential applications, has a main bus connected to individual branch circuits through individual connection points on the bus that are connectable to the circuit breakers for each branch circuit conductor. The branch circuit conductors supply electricity to the various loads within the residence. Because the circuit breakers, sometimes referred to herein simply as "breakers" for convenience, rely on simple thermal-magnetic protection, they may not provide full protection to all electrical malfunctions in the home. As a safety measure it is increasingly necessary to monitor and control branch circuits in the home for arc faults of both of the parallel and series arc types, i.e. combined arc fault interruption (CAFI), and for ground fault interruption (GFI). Protection against all these faults together is referred to as "dual function" protection.

Thus it would be desirable to provide the breakers of basic residential load centers with more protection capability through a simple and economical retrofit process.

SUMMARY OF THE DISCLOSED EMBODIMENTS

While the illustrated embodiments are explained with load centers in mind, and the terms "load center" and "panelboard" may sometimes be used interchangeably herein, the present invention is not necessarily limited to the miniature circuit breaker load center environment.

Aspects of the present invention may provide a retrofit remote control module for fitting between a branch circuit breaker and the load. The remote control module can provide the simple thermal-magnetic circuit breakers with arc fault or ground fault, or both, sensing and interruption capabilities. The retrofit remote control module may comprise a case which houses a current path represented by neutral and line conductors through the remote control module and appropriate connectors for connecting the module between the load side conductors of a simple thermal-magnetic circuit breaker and the downstream branch circuit wiring. The remote control module may further comprise line sensors for the current path and electronics connected to said line sensors which operate to detect the selected type of ground faults and arc faults to be controlled; and operate a bistable relay in the current path between the branch breaker and the load.

In some implementations, the line sensors/electronics may detect series arcs, or parallel arcs, or both. In some implementations the line sensors/electronics may detect ground faults. In some implementations, the line sensors/electronics may detect ground faults and both types of arc faults to provide so-called "dual function" circuit interruption.

In some implementations, the retrofit CAFI/GFI remote control module may have its bistable relay electromechanically operated while in other implementations the bistable relay could alternatively be a solid state relay. In some implementations, it may be desirable that the bistable relay has a push to test (PTT) button and a manual reset button extending from the case. In some implementations, it may be desirable that the retrofit CAFI/GFI remote control module have a communications link for receiving remote instructions to close, i.e. reset, the bistable relay.

Space considerations within the load center may dictate that the retrofit modules preferably be stand-alone modules which can be connected and function outside of the load center enclosure. In such cases it is desirable that the case of the module is sealed/weatherproofed against the intrusion of water and dirt. In other cases it may be desirable to locate the modules in an enclosure outside an adjacent load center containing the circuit breakers which need the additional functionality of the modules.

BRIEF DESCRIPTION OF THE DRAWINGS

The foregoing and other advantages of the disclosed embodiments will become apparent upon reading the following detailed description and upon reference to the exemplary explanatory drawings offered to illustrate the invention according to one or more embodiments disclosed herein, wherein.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1:
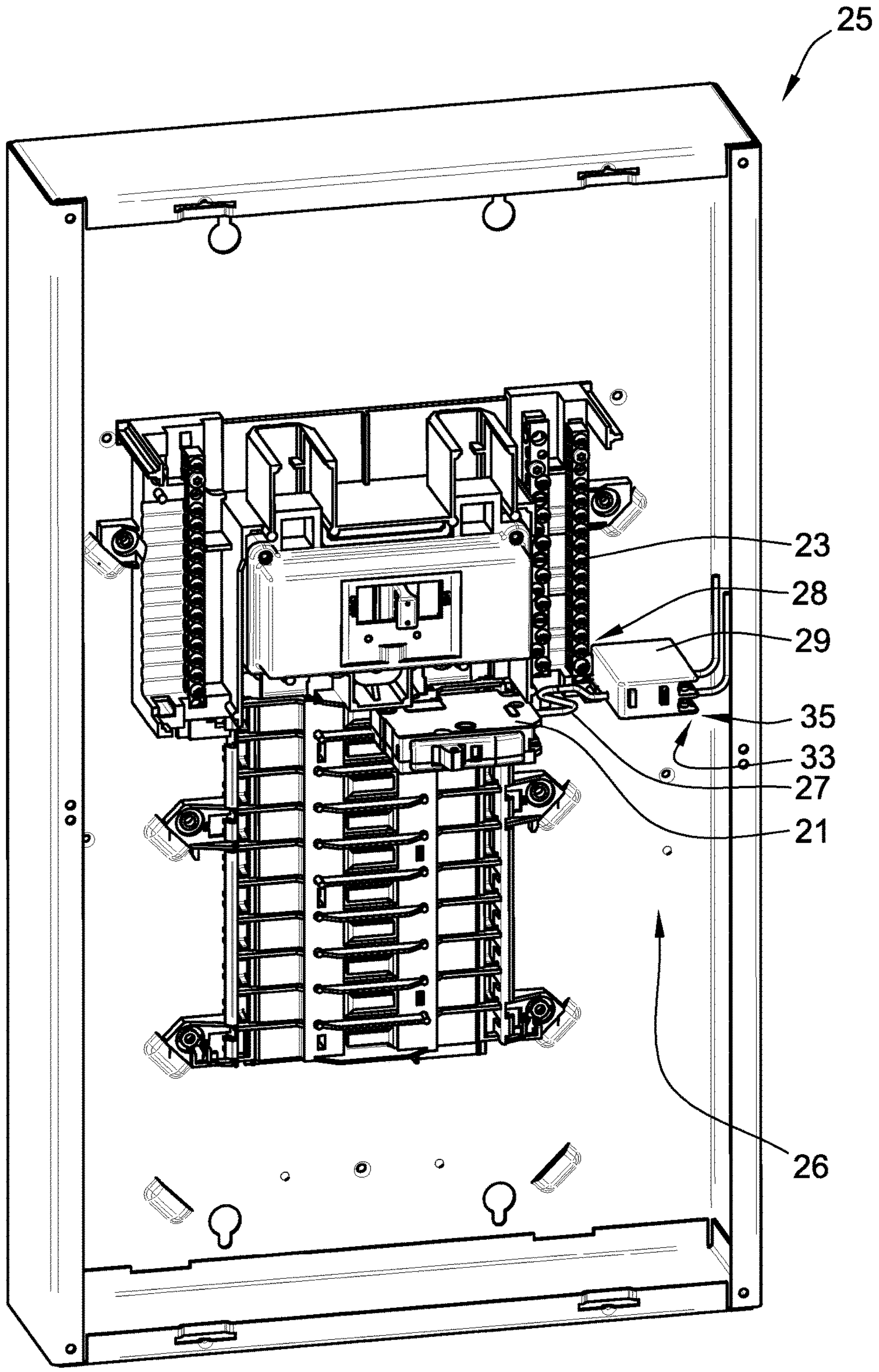
FIG. 1 is a top view of a partially constructed load center showing an installed thermal-magnetic circuit breaker and attached remote control module.
Figure 2:
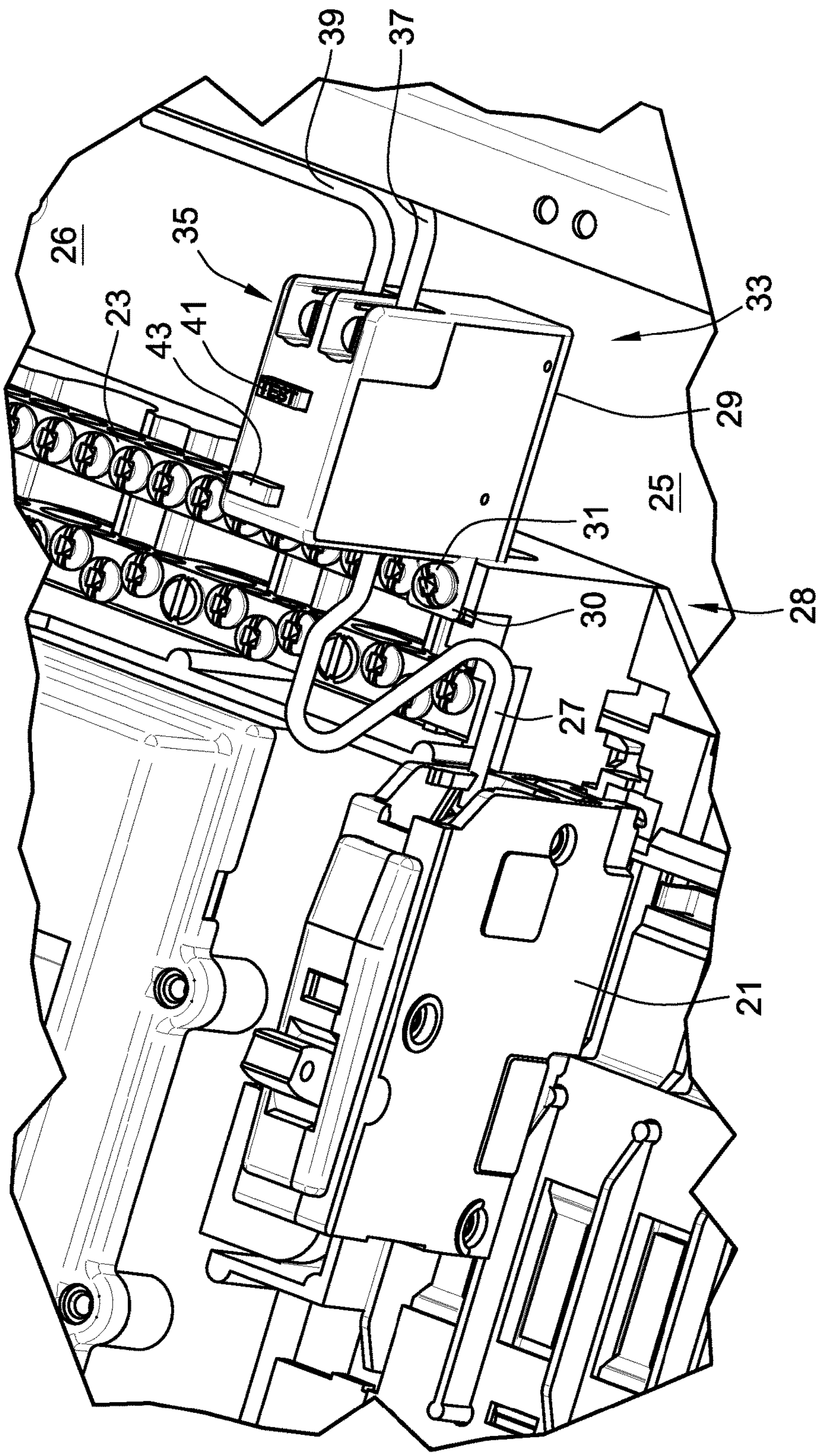
FIG. 2 is a top front perspective detail view of parts of FIG. 1 showing a thermal-magnetic circuit breaker connected to an exemplary retrofit CAFI/GFI remote control module according to one or more embodiments disclosed herein.

Referring now to FIG. 1 and FIG. 2, a thermal-magnetic miniature circuit breaker 21 and accompanying neutral rail 23 are shown within a partially constructed load center 25 without its faceplate or front door. The load side lug (not visible) of the circuit breaker 21 is attached to the line-in conductor 27 on the upstream side 28 of a exemplary retrofit remote control module 29. An upstream neutral conductor lug 30 of the remote control module 29 is shown attached by a screw 31 to the neutral bar 23 of the load center 25. The neutral lug 30 and the line-in conductor 27 are connectors for attaching the neutral and line conductors of the module current path to a branch circuit breaker on an upstream side 28 of the module 29 as further discussed below. In the alternative, if there is not room to locate the remote control module 29 within the load center 25, e.g. in the wiring gutters 26, it will be appreciated that a flexible conductive wire may be used for the upstream neutral conductor 30 and the remote control module 29 may be located outside of the load center enclosure. In such case, a separate enclosure (not shown) may then be utilized to house the remote control modules connected to each branch line of the load center. On the downstream, i.e. load, side 33 of the remote control module 29 are lugs 35, best seen in FIG. 4, which are connectors for connection of the line conductor wire 37 and neutral wire 39 of the branch circuit defined by the circuit breaker 21. On the top surface of the remote control module 29 are located a push-to-test button (PTT) 41 and a reset button 43 for the bistable relay, as further discussed below.

Figure 3:
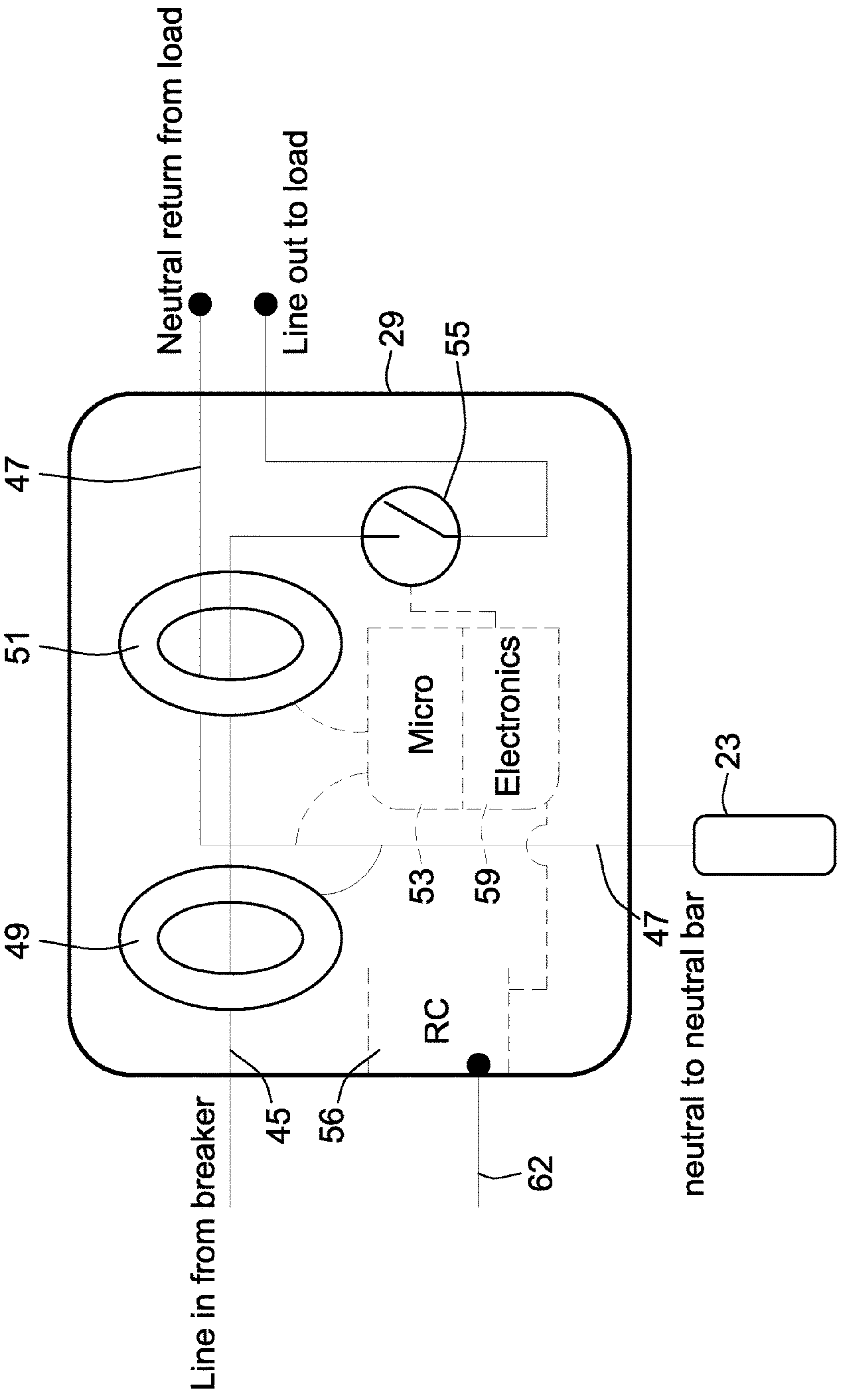
FIG. 3 is a schematic of the operating parts of the remote control module.

Referring also to FIG. 3, a line current conductor 45 and a neutral conductor 47 traverse the interior of the remote control module 29. A first current transformer 49 surrounds the line current conductor 45. A second current transformer 51 surrounds both the line conductor 45 and the neutral conductor 47. The current transformers 49, 51 are one example of apparatus used to sense the current flowing in the module 29 and the associated circuit breaker 21 (FIG. 2) to the subject branch circuit. The current transformers 49, 51 are wired to a microprocessor/controller 53 which determines if there are anomalies in sensed current flow which are indicative of ground faults or arc faults according to any of the techniques generally known in the art. If a ground fault or an arc fault is detected, the controller 53 will issue a signal to pulse a bistable relay 55 located across the line conductor 45, thereby opening the relay 55 and shutting off current to the branch circuit. Because the arcs carry little current, typically in the tens of amps range, the relay 55 may be used rather than opening the much more robust separable contacts of the thermal magnetic circuit breaker 21. A remote control apparatus 56 may be located in the module 29 to operate resetting of the separated relay contacts through the electronics 59 and frame and coil 61 (FIG. 4) of the bistable relay mechanism. The remote control apparatus 56 might utilize communications such as one of power line communications, radio frequency apparatus, or a separate hard-wired signal line 62.

Figure 4:
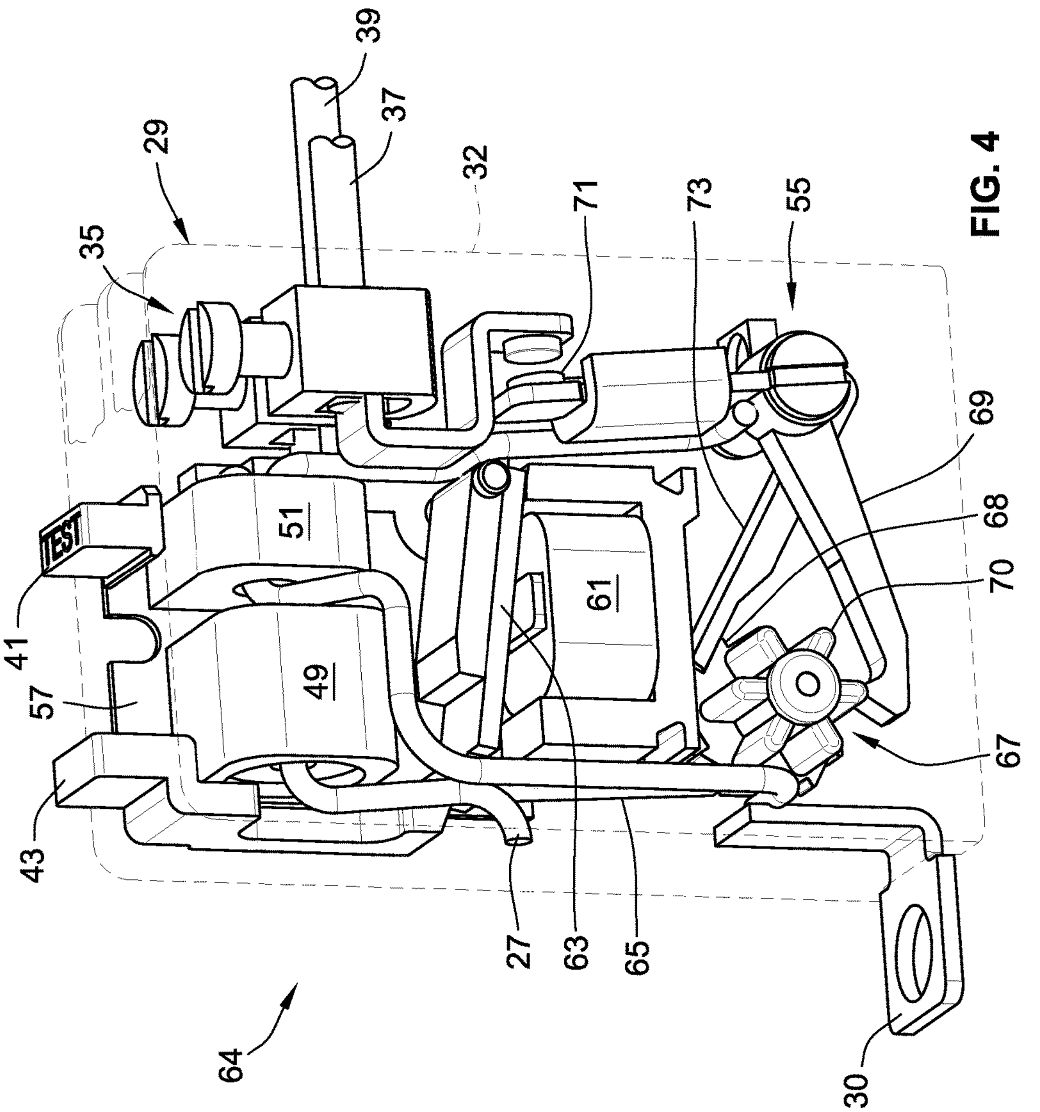
FIG. 4 is a side perspective view of the exemplary retrofit CAFI/GFI remote control module with the case in phantom to show internal details.
Figure 5B:
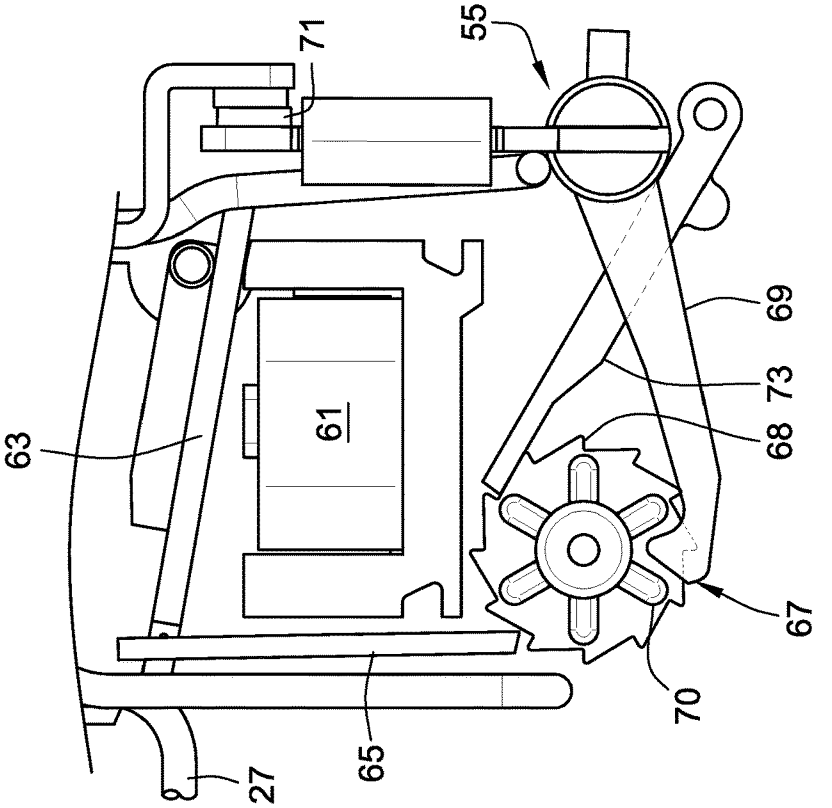
FIGS. 5A and 5B show the exemplary bistable relay of the in the remote control module in the open state and the closed state, respectively.
Figure 5A:
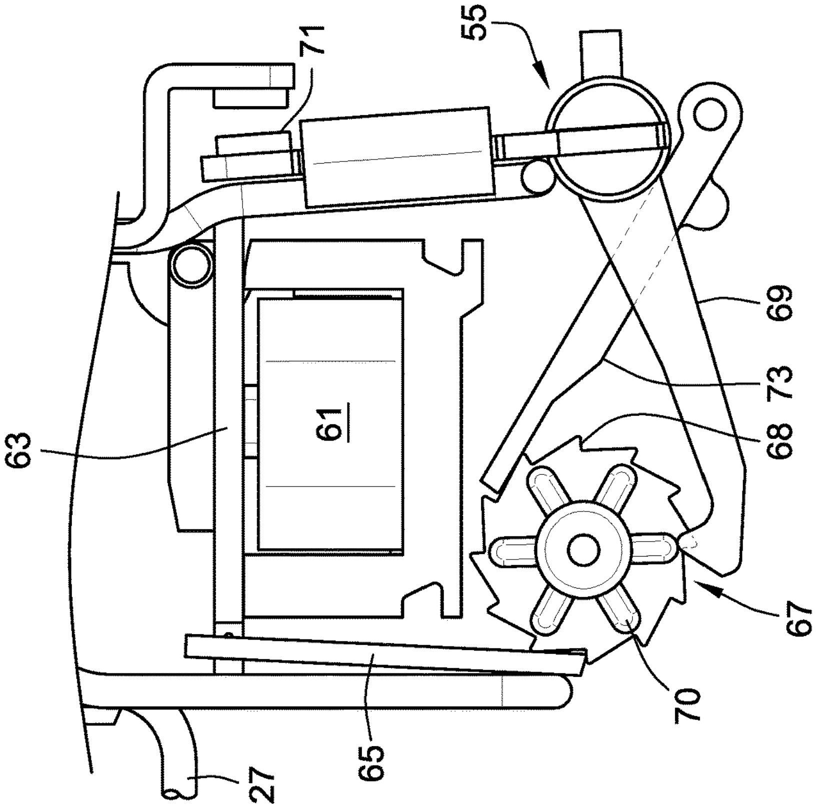

FIG. 4 illustrates one possible layout of certain functional elements of the remote control module 29. The sensing portion 64 of the module 29 is located over the bistable relay mechanism 55 within the case 32. A printed circuit board assembly (PCBA) 57 carries the first current transformer 49 and second current transformer 51 with the electronics of the sensing portion 64 mounted on the reverse side of the PCB as indicated in phantom by FIG. 3. The sensing portion 64 can include the microprocessor/controller 53 and any amplifiers, signal conditioners, or the like necessary for operation of the relay 55. The bistable relay 55, here shown as electromechanical, may comprise of a frame and coil 61 used to pull down a ferromagnetic armature 63, which operates a push rod 65 used to turn a gear cog 67 at its outer gear ring 68. The gear cog inner ring 70 in turn repositions a contact lever 69 on its cogs, thus opening or closing the movable contact 71 of the relay 55 with one cycle as seen respectively in FIGS. 5A and 5B. An anti-reverse stop 73 and various biasing springs may be included in the relay mechanism as would be understood by those of ordinary skill in the art. The reset button 43 is mechanically connected to the push rod 65 for resetting separated relay contacts. The remote control apparatus 56 is contained within the case 32 on the reverse side of the PCT as indicated in phantom by FIG. 3, and connected to the electronics 59 and frame and coil 61 as discussed above. The push to test (PTT) button 41 is mounted on the PCBA 57 in connection with the electronics 59 (FIG. 3) to test the operation of the bistable relay 55 according to methods known in the art.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the scope of the disclosed embodiments as defined in the appended claims.

What is claimed is:

1. A retrofit remote control module providing a simple thermal-magnetic circuit breaker with arc fault or ground fault, or both, sensing and interruption capabilities for a branch circuit, comprising:

- a case housing a current path with neutral and line conductors,
- line sensors for sensing current flow within the current path,
- electronics connected to the line sensors to determine anomalies in the sensed current flow, and
- a bistable relay in the current path between the simple thermal-magnetic circuit breaker and the load, the relay being operated by said electronics to open the branch circuit; and
- connectors for attaching the neutral and line conductors to a branch circuit on a downstream side of the module, and attaching the neutral and line conductors to the load side of the simple thermal-magnetic circuit breaker on an upstream side of the module.

2. The retrofit remote control module of claim 1 wherein the electronics include a microprocessor for determining the occurrence of series arcs.

3. The retrofit remote control module of claim 1 wherein the electronics include a microprocessor for determining the occurrence of parallel arcs.

4. The retrofit remote control module of claim 1 wherein the electronics include a microprocessor for determining the occurrence of ground faults.

5. The retrofit remote control module of claim 1 wherein the bistable relay is electromechanically operated.

6. The retrofit remote control module of claim 1 wherein the module has a push to test button for testing the operation of the bistable relay.

7. The retrofit remote control module of claim 1 wherein the module has a manual reset button extending from the case for closing the bistable relay.

8. The retrofit remote control module of claim 1 further comprising a communications link for receiving remote instructions to close the bistable relay.

9. The retrofit remote control module of claim 1 wherein the case is sealed/weatherproof.

10. The retrofit remote control module of claim 1 wherein the module is contained inside a load center and is connected to a circuit breaker within the load center.

* * * * *